(12) United States Patent
Nozaki

(10) Patent No.: US 7,656,754 B2
(45) Date of Patent: Feb. 2, 2010

(54) OPTICAL DISK PLAYER

(75) Inventor: Koji Nozaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 657 days.

(21) Appl. No.: 11/188,851

(22) Filed: Jul. 26, 2005

(65) Prior Publication Data
US 2006/0023599 A1 Feb. 2, 2006

(30) Foreign Application Priority Data
Jul. 27, 2004 (JP) ............ P2004-218102

(51) Int. Cl.
*G11B 21/08* (2006.01)
(52) U.S. Cl. .................. 369/30.03
(58) Field of Classification Search .......... 369/47.21, 369/53.21
See application file for complete search history.

(56) References Cited

U.S. PATENT DOCUMENTS

| | | | | |
|---|---|---|---|---|
| 4,626,106 A | * | 12/1986 | Hooper | 368/107 |
| 4,898,814 A | * | 2/1990 | Kwon | 435/6 |
| 5,905,797 A | * | 5/1999 | McRae | 705/57 |
| 6,104,813 A | * | 8/2000 | McRae | 380/201 |
| 7,233,916 B2 | * | 6/2007 | Schultz | 705/26 |
| 2005/0251834 A1 | * | 11/2005 | Hulbig | 725/78 |

FOREIGN PATENT DOCUMENTS

| | | |
|---|---|---|
| JP | 8-195064 | 7/1996 |
| JP | 9-512657 | 12/1997 |
| JP | 10-334592 | 12/1998 |
| JP | 2001-283018 | * 10/2001 |
| JP | 2002-50126 | 2/2002 |
| JP | 2002-123801 | 4/2002 |

* cited by examiner

*Primary Examiner*—Joseph H Feild
*Assistant Examiner*—Henok G Heyi
(74) *Attorney, Agent, or Firm*—Morgan, Lewis & Bockius LLP

(57) ABSTRACT

An available term of use of the player is set in terms of the number of dates or a playing time. If it is determined by a lock-setting determining unit that the player is lock-set when an optical disk is loaded, the player is lock-released by a lock releasing unit. After the player has been lock-released, if the available term is extended as a result that it is determined by an available term determining unit that the available term has expired or if it is determined that the available term has not expired yet, a playing start processing unit proceeds to processing of starting the playing. If the available term has expired, but should not be extended, the player is lock-set by a lock setting unit.

1 Claim, 3 Drawing Sheets

OPTICAL DISK PLAYER

BACKGROUND OF THE INVENTION

1. Field of the Invention

This invention relates to an optical disk player for reproducing information recorded on an optical disk and more particularly to an optical disk player used for rental.

2. Description of the Related Art

Recently, digital data of an image or picture such as a movie or sports have been recorded on an optical disk such as DVD (digital versatile disk). By playing such an optical disk loaded in the optical disk player, a user can enjoy the movie or sports.

Further, recently there have been many rental shops who rent out for the user (customer) the optical disk such as the DVD with the movie or sports by setting the required rental fee and available term. Namely, by setting a required rental fee and available term, such a rental shop rents out for the user the optical disk the user hopes to enjoy. The user loads the optical disk rented in his own optical disk player. In order that the optical disk can be played, the user inputs a password previously recorded on the optical disk into the optical disk player to release locking of the optical disk, thereby playing the optical disk.

SUMMARY OF THE INVENTION

Meanwhile, where the user rents not the optical disk but the optical disk player itself, because a conventional optical disk player does not incorporate a function of setting the available term, in renting the optical disk player, the rental shop enters the dates for rental and available term on a rental slip and hands it to the user. And when the available term is expired, the user will return the optical disk player to the rental shop. However, if the user does not return it even after the available term has expired, an extension fee is added.

Meanwhile, in rental of such a conventional optical disk player, on the side of the rental shop, if the user does not return the apparatus (player) although the available term has expired, the rental shop is obliged to notice the user of return by e.g. telephone. If the extension is made, the rental shop must collect the extension fee. Such works were troublesome, thus leading to reduction in business efficiency. On the other hand, on the side of the user, even if the available term expires, for the reason why the apparatus can be used for playing as it is, the user was collected the extension fee although he does not use the apparatus. In short, the conventional optical disk player, where it is used for rental, the rental shop was given impaired business efficiency whereas the user was given troublesomeness that he must use the apparatus while always caring the available term.

JP-A-10-334592 relates to limited use of information transmission service in which a reproduced output is stopped if the set limited time of use is exceeded, but does not relate to rental of the optical disk player. JP-A-2002-123801 relates to decision of play-permission/play-inhibition based on a device time, area, etc. and does not relates to rental of the optical disk player. JP-A-2001-283018 relates to rental of a data file but does not relates to rental of the optical disk player.

This invention has been accomplished in order to solve the problems described above.

It is an object of this invention to provide an optical disk player which can be used as a rental device by adding a function of automatically locking the player if a preset available term expires.

According to one aspect of the invention, there is provided an optical disk player for reproducing information recorded on an optical disk, the optical disk player including: a system controller having; an available term setting unit for setting an available term of use of the optical disk player in terms of the number of dates and a playing time; a lock-setting determining unit for determining whether or not the player is lock-set when the optical disk is loaded; a lock-releasing unit for lock-releasing the player when an optical disk for lock-releasing is loaded if it is determined that the player has been lock-set; a message displaying unit for displaying on a display device a message requesting that the optical disk for lock-releasing is loaded if it is determined that the player has been lock-set and if the optical disk for lock-releasing has not been loaded; an available term determining unit for determining whether or not the available term expires after the player has been lock-released; a playing start processing unit for starting the playing when the available term is extended as a result that it is determined that the available term has expired, or if it is determined that the available term has not expired; and a lock-setting unit for lock-setting the player if the available term has expired but should not be extended.

In this configuration, the available term setting unit sets an available term of use of the optical disk player in terms of the number of dates and a playing time. If it is determined by the lock-setting determining unit for determining that the player has been lock-set when the optical disk is loaded, the lock-releasing unit lock-releases the player when an optical disk for lock-releasing is loaded. If it is determined that the player has been lock-set and if the optical disk for lock-releasing is not loaded, the message displaying unit for displaying on a display device a message requesting that an optical disk for lock-releasing is loaded. After the player has lock-released, when the available term is extended as a result that it is determined that the available term has expired by the available term determining unit, or if it is determined that the available term has not expired, the playing start processing unit proceeds to the processing of starting playing. If the available term has expired but should not be extended, the lock-setting unit lock-sets the player.

In accordance with this configuration, since the player is automatically lock-set when a preset available term expires, the optical disk player which can be used for a rental device can be provided.

According to another aspect of the invention, there is provided an optical disk player for reproducing information recorded on an optical disk, including: a system controller having a function of setting an available term of use of the player and lock-setting the player when the available term expires, the system controller being capable of lock-releasing the player using an data for lock-releasing when the available term expires.

In this configuration, when the available term expires, the player is lock-set. And when the data for lock-releasing is loaded, the player is lock-released. Thus, in accordance with this configuration, since the player is automatically lock-set when a preset available term expires, the optical disk player which can be used for a rental device can be provided.

According to another aspect of the invention, the system controller further includes: an available term setting unit for setting an available term of use of the optical disk player in terms of the number of use of the player in terms of the number of dates and playing time; a lock-setting determining unit for determining whether or not the player has been lock-set when the optical disk is loaded; a lock-releasing unit for lock-releasing the player when the data for lock-releasing is loaded if it is determined that the player has been lock-set; an available term determining unit for determining whether or not the available term expires after the player has been lock-released; a playing start processing unit for starting the playing when the available term is extended as a result that it is determined that the available term has expired, or if it is determined that the available term has not expired; and a lock-setting unit for lock-setting the player if the available term has expired but should not be extended.

According to another aspect of the invention, the available term set by the available term setting unit is set in accordance with at least one of the number of dates and a playing time.

According to another aspect of the invention, the system controller further includes a message displaying unit for displaying on a display device a message requesting that the optical disk for lock-releasing is loaded if it is determined that the player has been lock-set and the data for lock-releasing has not been loaded.

In accordance with this configuration, if the player has been lock-set, the user can instantly know that the optical disk for lock-releasing must be loaded, thereby giving good operability to the user.

As described above, in accordance with the above-aspects, there is provided a system controller including: an available term setting unit for setting an available term of use of the optical disk player in terms of the number of use of the player in terms of the number of dates and playing time; a lock-setting determining unit for determining whether or not the player is lock-set when the optical disk is loaded; a lock-releasing unit for lock-releasing the player when an optical disk for lock-releasing is loaded if it is determined that the player has been lock-set; a message displaying unit for displaying on a display device a message requesting that the optical disk for lock-releasing is loaded if it is determined that the player has been lock-set and the optical disk for lock-releasing has not been loaded; an available term determining unit for determining whether or not the available term expires after the player has been lock-released; a playing start processing unit for proceeding to processing of starting the playing when the available term is extended as a result that it is determined that the available term has expired, or if it is determined that the available term has not expired; and a lock-setting unit for lock-setting the player if the available term expires but should not be extended. For this reason, since the player is automatically lock-set when a preset available term expires, the optical disk player which can be used for a rental device can be provided.

Further, in accordance with the above-aspects, there is provided a system controller having a function of setting an available term of use of the player and lock-setting the player when the available term expires, capable of lock-releasing the player using an optical disk for lock-releasing when the available term expires. For this reason, since the player is automatically lock-set when a preset available term expires, the optical disk player which can be used for a rental device can be provided.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Figure 1:
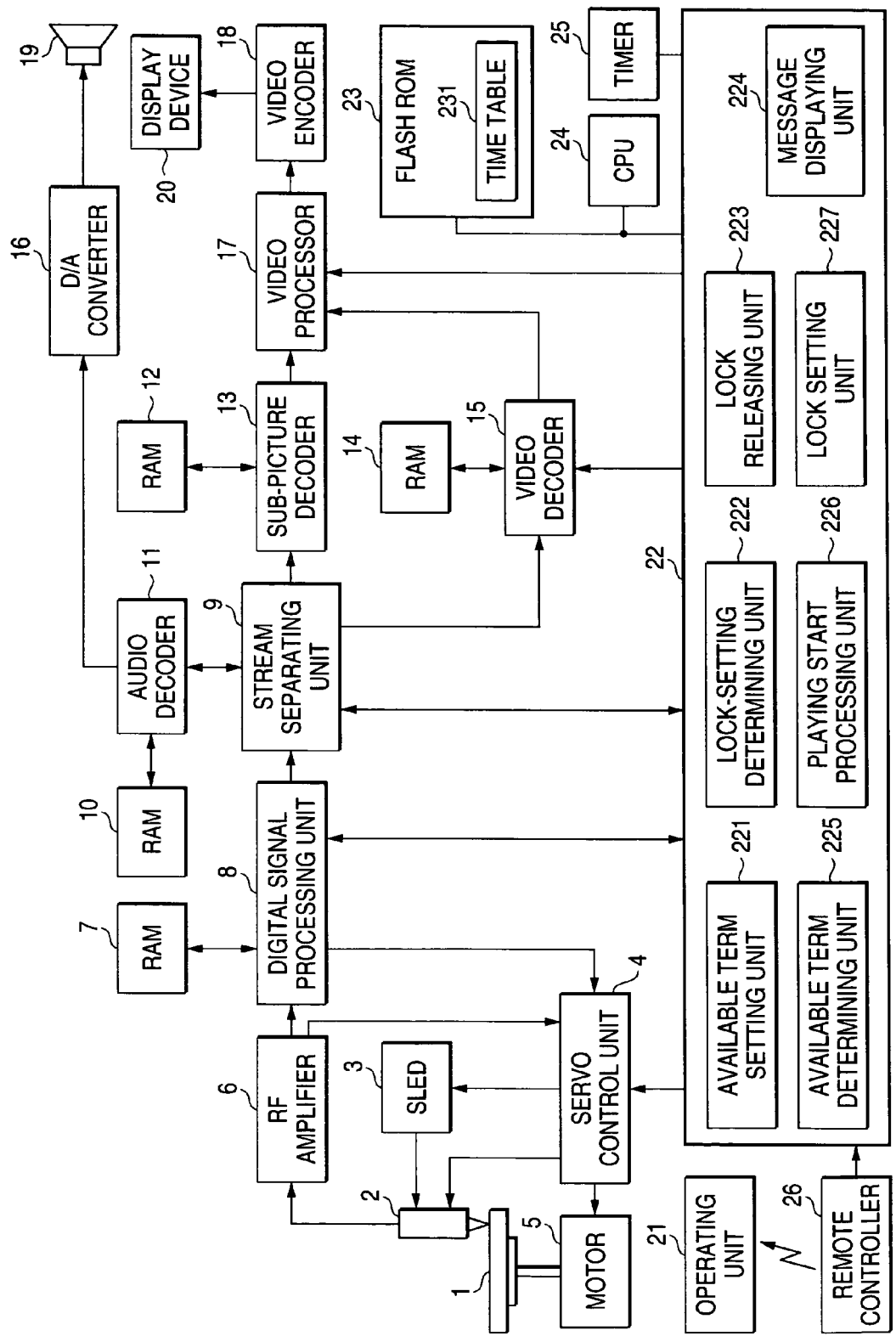
FIG. 1 is a block diagram showing the configuration of the optical disk player according to an embodiment of this invention.

Now referring to the attached drawings, an explanation will be given of various embodiments of this invention. FIG. 1 is a block diagram showing the configuration of the optical disk player according to an embodiment of this invention.

The optical disk player includes a spindle motor 5 for rotating an optical disk 1; an optical pickup 2 for emitting a laser beam for reproducing information recorded on the optical disk 1 and receiving the beam reflected from the optical disk 1; a sled 3 for moving the optical disk 2 in a radial direction of the optical disk 1; and a servo control unit 4 of making control of moving the focal point of the laser beam vertically and horizontally for a recording face of the optical disk 1 by driving the spindle motor 5 and sled 3 and moving an objective lens (not shown) incorporated in the optical pickup 2 according to an instruction by a system controller 22.

The optical disk player further includes an RF amplifier 6 for amplifying an RF signal which is a signal read from the optical pickup during playing of the optical disk 1; a digital signal processing unit 8 for converting the RF signal outputted from the RF amplifier 6 into digital data, thereafter subjecting the digital data to signal decoding processing and error correction processing corresponding to the data format of the optical disk 1 and storing the data thus created in a RAM 7; and a stream separating unit 9 for separating audio data, sub-picture data and video data from one another from among the data stream outputted from the digital signal processing unit 8 according to an instruction by the system controller 22.

The optical disk player further includes an audio decoder 11 for executing predetermined decoding processing for the audio data outputted from the stream separating unit 9; a RAM 10 for temporarily storing the data to be subjected to the decoding processing by the audio decoder 11; a sub-picture decoder 13 for executing predetermined decoding processing for the sub-picture data outputted from the stream separating unit 9; a RAM 12 for temporarily storing the data to be subjected to the decoding processing by the sub-picture decoder 13; a video decoder 15 for executing predetermined decoding for the video data outputted from the stream separating unit 9; and a RAM 14 for temporarily storing the data to be subjected to the decoding processing by the video decoder 15.

The optical disk player further includes a video processor 17 for synthesizing data outputted from the video decoder 15 and data outputted from the sub-picture decoder 13 according to an instruction by the system controller 22; a video encoder 18 for converting the synthesized data outputted from the video processor 17 into a video signal for display and displaying the resultant image on a display device 20; and a D/A converter 16 for converting the data outputted from the audio decoder 11 into an analog audio signal to be supplied to e.g. a speaker 19.

The optical disk player further includes an operating unit 21 having a play key (not shown) for giving an instruction of play, a stop key for giving an instruction of play stopping and other various operation keys (not shown); and the above system controller 22 for controlling the entire player. The operating unit 21 is provided with a light-receiving unit (not shown) for receiving an optical signal indicative of an operation command from a remocon (remote controller) 26. The light-receiving unit converts the optical signal received into an electric signal which is supplied to the system controller 22 as a command signal.

The optical disk player further includes a flash ROM 23 for storing a program and data used for controlling the respective components of the player and the entire player, a CPU 24 for executing the operation processing according to the program and data stored in the flash ROM 23 to control the system controller 22 and a timer 25 for counting the available term of the player in terms of the number of data and a playing time.

The system controller includes constituent components which characterizes this embodiment, i.e. an available term setting unit 221 for setting an available term of use of the optical disk player in terms of the number of use of the player in terms of the number of dates and playing time; a lock-setting determining unit 222 for determining whether or not the player is lock-set when the optical disk is loaded; a lock-releasing unit 223 for lock-releasing the player when the optical disk for lock-releasing is loaded if it is determined that the player has been lock-set;

a message displaying unit 224 for displaying on a display device a message requesting that the optical disk for lock-releasing is loaded if it is determined that the player has been lock-set and if the optical disk for lock-releasing has not been loaded; an available term determining unit 225 for determining whether or not the available term expires after the player has been lock-released; a playing start processing unit 226 for starting the playing when the available term is extended as a result that it is determined that the available term has expired, or if it is determined that the available term has not expired; and a lock-setting unit 227 for lock-setting the player if the available term has expired but should not be extended.

Figure 2:
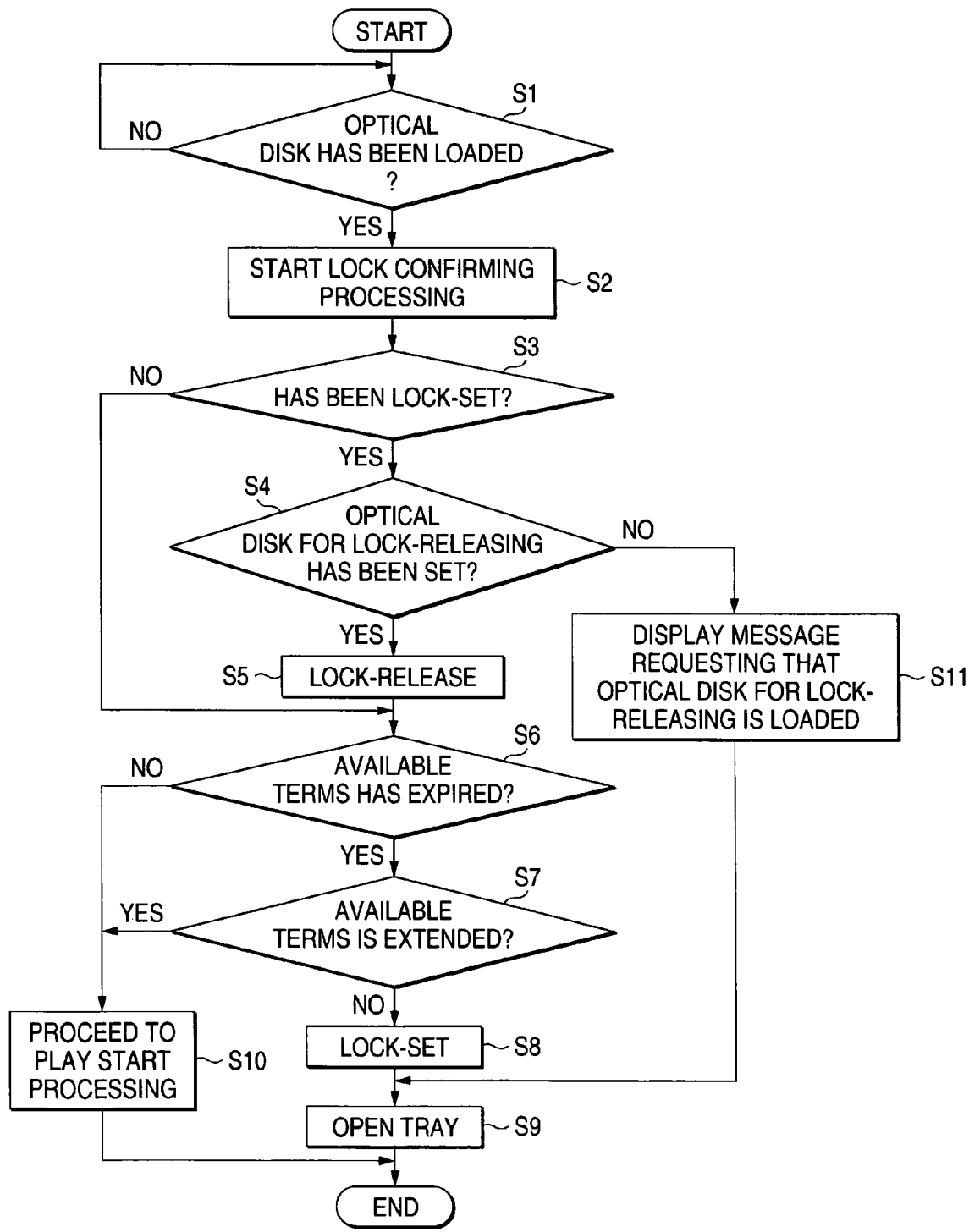
FIG. 2 is a flowchart for explaining the processing for lock-releasing and lock-setting in the player according to this embodiment.

FIG. 2 is a flowchart for explaining the processing for lock-releasing and lock-setting in the player according to this embodiment. Referring to this flowchart, an explanation will be given of the processing of lock-releasing and lock-setting the player.

First, when the user loads the optical disk in the optical disk player, the system controller 22 recognizes that the optical disk has been loaded (step S1) and starts lock-confirmation processing (step S2). When the lock-confirmation is started, it is determined by the lock-setting determining unit 222 whether or not the player has been lock-set. Where it is determined in step S3 that the player has been lock-set, in order to lock-release the player, when an optical disk for lock-releasing is loaded in place of the optical disk loaded in step S1 (step S4), the player is lock-released by the lock-releasing unit 223 (step S5).

Thereafter, it is determined by the available term determining unit 225 whether or not the available term of use of the player has expired (step S6). Where the available term is set in terms of the number of dates, the timer 25 counts the number of dates from the date of rental and if the available term expires, produces an available term signal. Because the timer 25 is operated by a back-up battery (not shown), if the rental shop sets the number of dates, the timer 25 can start counting from this point in time. Where the available term is set in terms of a playing time, the timer 25 counts the playing time from when the processing for playing of the optical disk is started, and if the playing time reaches a preset time, produces the available term signal. Incidentally, the available term can be set, for example, by a producer at the request of the rental shop, or by the rental shop on the basis of an instruction by the producer. Otherwise, the available term can be set by inputting in the optical disk player a specific password known by only the rental shop.

Figure 3:
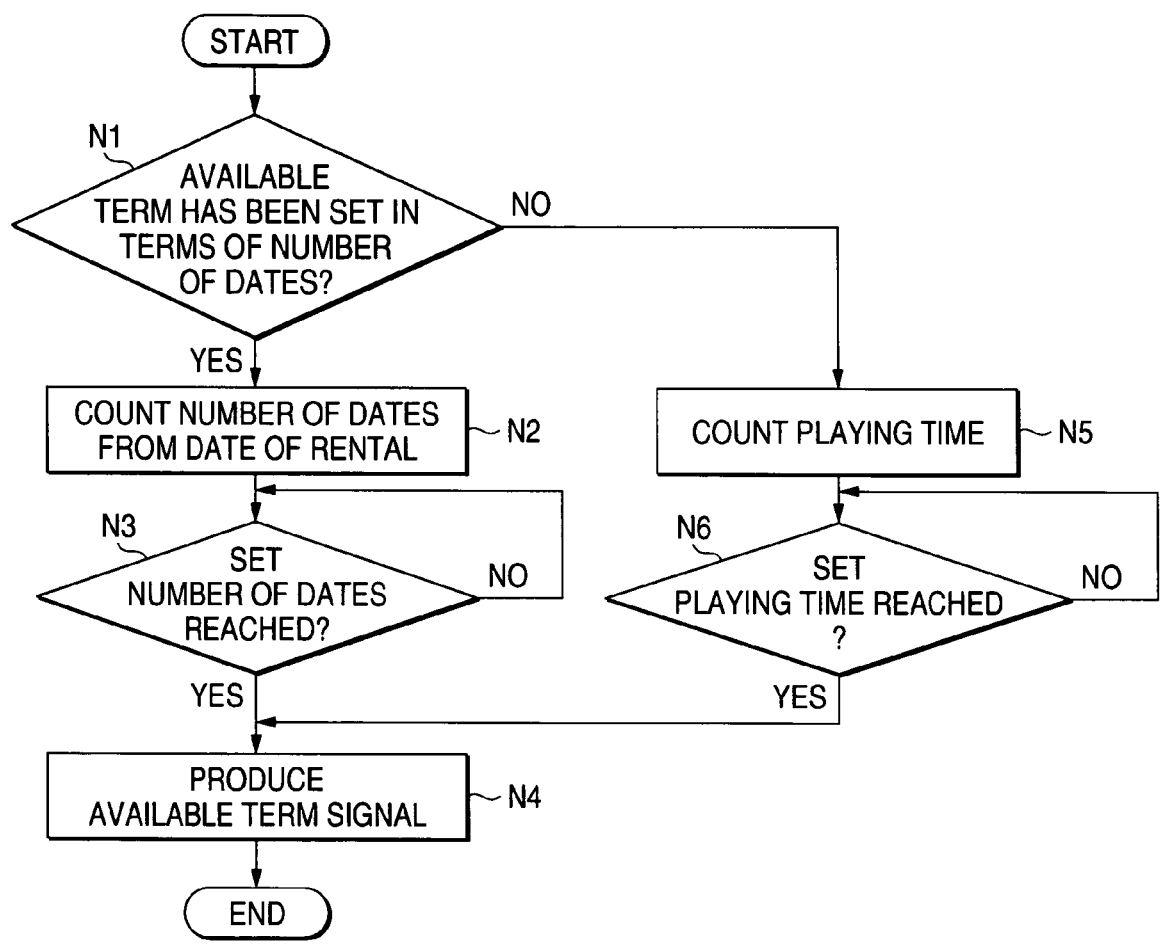
FIG. 3 is a flowchart for explaining the processing in a timer according to this embodiment.

Referring to the flowchart of FIG. 3, the processing in the timer 25 will be explained. First, it is determined whether the available term is set in terms of the number of dates or a playing time (step N1). If the available term is set in terms of the number of dates, the timer 25 counts the number of dates from the date of rental (step N2), and if the set number of dates is reached (step N3), produces an available term signal (step N4). Incidentally, the number of dates from the date of rental maybe counted from the date following the date of rental, or from the date of rental or the following date according to the rental time of the date of rental.

If the available term is set in term of the playing time, the timer 25 counts the playing time from the date of rental (step N5), and if the set playing time is reached (step N6), produces the available term signal (step N4) Thus, the available term determining unit 225 of the system controller 22, when having received the available term signal from the timer 25, can determine that the available term has expired.

Returning to FIG. 2, if the available term is extended as a result that it is determined by the available term determining unit 225 that the available term has expired (step S6), or if it is determined that the available term has not expired yet, the playing start processing unit 226 proceeds to the processing of starting the playing. Incidentally, the available term is extended, for example where the player is preset so that the available term is extended when the player is lock-released in step S5.

On the other hand, where the player is preset so that the available term is not extended even when the player is lock-released in step S5, the player is lock-set by the lock-setting unit 227 (step S8). Subsequently, the tray of the player is opened (step S9) and the optical disk loaded is taken out.

Further, in step S4, if the optical disk for lock-releasing is not loaded, the message displaying unit 224 displays on the display device 20 a message requesting that the optical disk for lock-releasing is loaded (step S11). And in order to load the optical disk for lock-releasing in the player, the tray is opened (step S9). Thus, if the optical disk for lock-releasing is loaded in the player, the player is lock-released.

In the above-embodiment, the optical disk is used for lock-releasing. However, a data obtained from the internet may be used a data for lock-releasing instead of the optical disk.

As understood from the description hitherto made, in accordance with this embodiment, if the preset available term expires, the player is automatically lock-set. For this reason, the optical disk player which can be used for a rental device can be provided.

What is claimed is:

1. An optical disk player for reproducing information recorded on an optical disk, comprising:
   a system controller having:
   an available term setting section operable to set an available term of use of the player in terms of the number of dates and a playing time;
   a lock-setting determining section operable to determine whether or not the player is locked when a first optical disk is loaded into the player;
   a message displaying section operable to display a message requesting to load a second optical disk into the player when the lock-setting determining section determines that the player is locked;
   a lock releasing section operable to unlock the player when the second optical disk is loaded into the player;
   an available term determining section operable to determine whether or not the available term expires when the player is unlocked;

a reproducing processing section operable to start reproducing the first optical disk; and a lock setting section operable to lock the player;

wherein when the available term determining section determines the available term expires, the system controller determines whether or not to extend the available term;

wherein when the system controller determines not to extend the available term, the lock setting section locks the player;

wherein when the available term determining section determines that the available term does not expire or the system controller determines to extend the available term, the reproducing processing section operable to start reproducing the first optical disk; and wherein the system controller determines to extend the available term when the player is preset to extend the available term after the player is unlocked.

* * * * *